United States Patent

[11] 3,544,757

[72] Inventors Rodney E. Christian
 Bloomfield Hills;
 Peter C. Taudvin, Birmingham, Michigan
[21] Appl. No. 841,663
[22] Filed May 22, 1969
 Division of Ser. No. 638,556, May 15, 1967,
 now Patent No. 3,476,170
[45] Patented Dec. 1, 1970
[73] Assignee Material Transformation Associates, Inc.
 Detroit, Michigan
 a corporation of Michigan. by mesne
 assignment

[54] METHOD OF MELTING A LEVITATED MASS
 1 Claim, 3 Drawing Figs.
[52] U.S. Cl. ................................................... 219/121
[51] Int. Cl. ....................................................... H05b 5/00,
 B23k 9/00
[50] Field of Search............................................. 219/69,
 121, 121(EB), 121(Laser), 7.5, 10.49; 13/31, 26;
 164/48, 65, 50, 258; 167/46, 49, 51, 147, 251,
 256; 219/7.5, 121

[56] References Cited
 UNITED STATES PATENTS
2,664,496 12/1953 Brace .......................... 13/26
2,686,864 8/1954 Wroughton et al. .......... 13/26
2,686,865 8/1954 Kelly ............................ 13/26
2,957,064 10/1960 Comenetz .................... 219/10.49
3,303,319 2/1967 Steigerwald ................. 219/121
3,342,250 9/1967 Treppschuh et al. ........ 219/121
3,360,398 12/1967 Garibotti ...................... 219/121

Primary Examiner—J. V. Truhe
Assistant Examiner—L. H. Bender
Attorney—Harness, Dickey & Pierce ABSTRACT: This application discloses an apparatus and method for forming a casting having a high purity wherein the material to be cast is levitated by the forces of a magnetic field generated by the passage of an alternating electric current through an induction coil. The thus levitated mass is then subjected to a laser beam generating sufficient energy to elevate the temperature of the levitated material to its melting point. This molten mass is then transferred to a mold by changing the current flow through the levitating coil. The mold may be formed from the same material as that which is being cast so that the mold itself forms a portion of the finished casting or may be formed from a different material that is removed after the cast material cools.

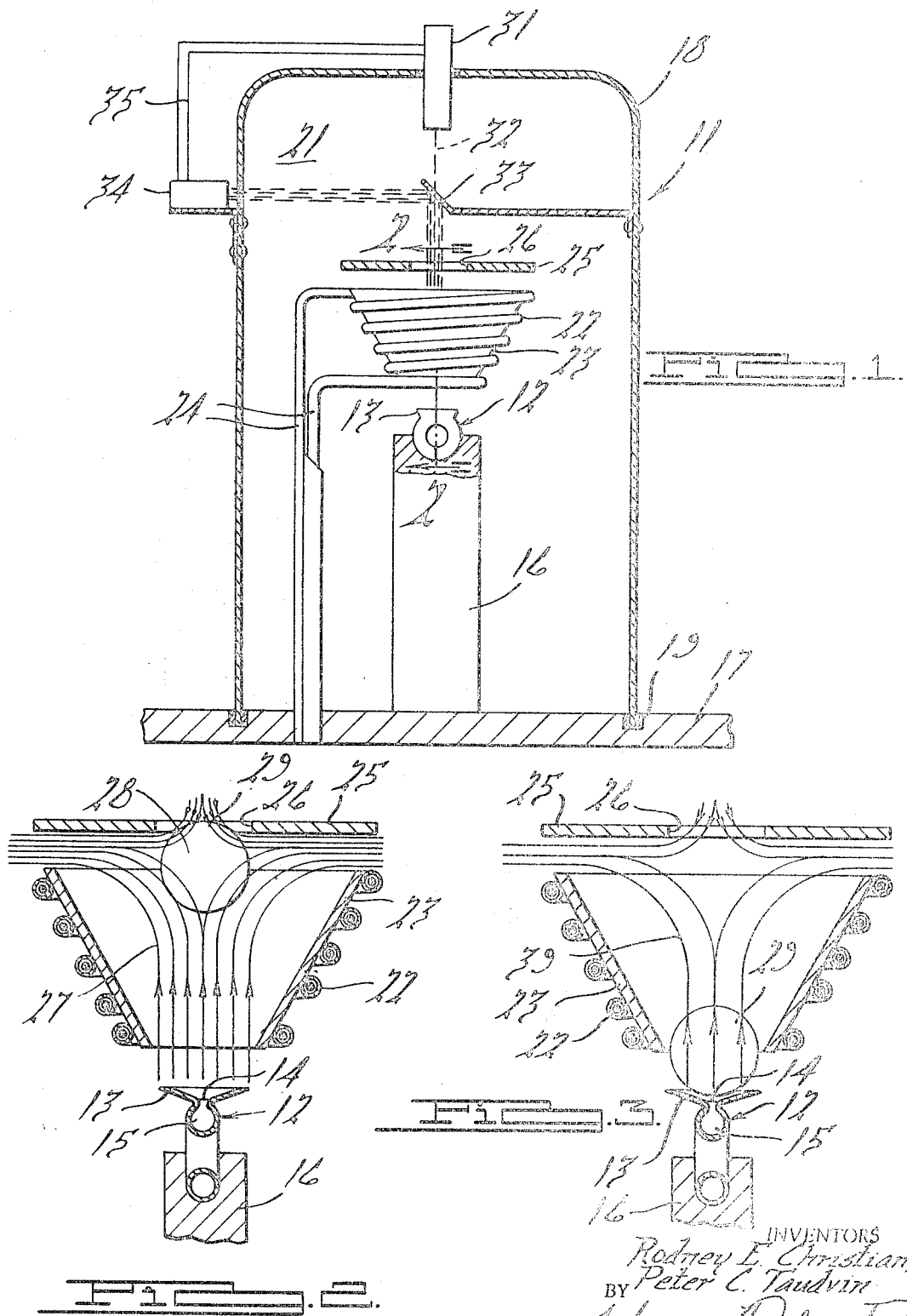

3,544,757

METHOD OF MELTING A LEVITATED MASS

BACKGROUND OF THE INVENTION

This invention relates to a method of melting and casting a material to form objects having extremely high purities and this application is a division of our U.S. Pat. No. 3,476,170 dated Nov. 4, 1969 application Ser. No. 638,556, filed May 15, 1967 and entitled "Casting Method with Laser Beam Melting of Levitated Mass" now issued as U.S. Pat. No. 3,476,170 on Nov. 4, 1969.

The copending applications for U.S. Letters Patent entitled "Casting Method and Apparatus," Ser. Nos. 520,461 now U.S. Pat. No. 3,402,754 and now 520,462, now U.S. Pat. No. 3,402,755 filed in the name of Rodney E. Christian on Jan. 13, 1966 and assigned to the assignee of this invention, disclose methods of casting objects resulting in a high degree of surface finish and accuracy without necessitating excessive subsequent finishing operations.

In the method shown and described in said application, Ser. No. 520,461, now U.S. Pat. No. 3,402,754 this high degree of surface finish is achieved by casting molten metal into a thin, hollow metallic mold, which mold forms the exterior surface of the finished article. An intimate bond is required between the mold and the thus cast material to preclude cracking or chipping of the exterior surface of the finished article, which previously formed the mold, from the core. This is particularly important when the article is to be subjected to bending, tensile or other stresses wherein cracks might otherwise occur. A more intimate bond may be developed when the material cast and that being cast have a high degree of purity. Previously, the materials to be cast have been brought to the molten state in crucibles or have been poured from crucibles thus exposing them to the possibility of contamination from the crucible.

In the method shown and described in said U.S. Pat. application Ser. No. 520,462, a high degree of surface finish is achieved by forming a thin mold from a material amenable to a vacuum disposition technique. The material from which the finished article is to be formed is brought to a molten state and poured into this thin mold. After the poured material cools, the thin mold is removed by a destructive or other technique. With this method it is also desirable to maintain a high degree of purity of the material being cast.

It is, therefore, a principal object of this invention to provide a method of heating an object without the use of a crucible.

It is a further object of this invention to provide an improved method of melting objects without the possibility of contamination.

It is another object of this invention to provide an improved method for forming castings having high degrees of purity.

SUMMARY OF THE INVENTION

This invention is embodied in a method of melting an electrically conductive material without entraining impurities in the material during the melting. This method comprises the steps of levitating a mass of the material to be melted by subjecting it to a magnetic field generated by an alternating electric current passing through an induction coil. The thus levitated mass is then subjected to sufficient energy from a source other than the electrical levitating force to raise the temperature of the levitated mass to its melting point.

BRIEF DESCRIPTION OF THE DRAWINGS

FIG. 1 is a cross-sectional view, in part schematic, showing an apparatus for practicing this invention.

FIG. 2 is an enlarged cross-sectional view taken along the line 2–2 of FIG. 1.

FIG. 3 is a cross-sectional view, in part similar to FIG. 2, showing a different stage in the casting process.

DETAILED DESCRIPTION OF THE PREFERRED EMBODIMENT

In FIG. 1, the reference numeral 11 illustrates a casting apparatus embodying this invention and particularly adapted for use in performing the inventive method disclosed herein. Some of the elements of the apparatus 11 have been illustrated schematically since the details of their construction form no part of the invention. Although other uses in the metallurgical or other related fields will suggest themselves to those skilled in the art, the apparatus 11 is particularly useful in forming cast objects having a high degree of surface finish with little or no subsequent finishing operations.

The metal to be cast is deposited into a mold, indicated generally by the reference numeral 12, which mold is depicted as being in a generally annular form. The mold 12 may be formed by one of the methods disclosed in the aforenoted patent applications of Rodney E. Christian. If the method disclosed herein is to be used in conjunction with that disclosed in the aforenoted application Ser. No. 520,461, now U.S. Pat. No. 3,402,754, the mold 12 will be formed from gold, silver or some other metal which lends itself to a vacuum disposition process and will be the same as the material to be cast into it. If the method disclosed herein is to be used in conjunction with the method disclosed in the aforenoted application Ser. No. 520,462, now U.S. Pat. No. 3,402,755 the mold 12 is also formed from a material adapted to a vacuum disposition process and will be removed after the poured material has cooled or solidified. A sprue or pouring funnel 13 is formed at one end of the mold 12 with an opening 14 that registers with an annular cavity 15 formed by the mold 12. The mold 12 is supported upon a pedestal 16 which is, in turn, affixed to a base plate 17.

The pedestal 16, mold 12 and certain other components of the apparatus are enclosed within an inverted bell jar 18 that has a seal 19 interposed between its lower end and the plate 17. This forms an enclosed area 21 that is evacuated to an extremely low vacuum, for example, a vacuum in the order of 10 to minus 7 ($10^{-7}$) torr. by any known apparatus. This high degree of vacuum assists in maintaining a high purity of the cast material and also promotes a stronger bond between the material cast and the inner surface of the shell 12.

Disposed within the area 21 is a conical-shaped induction coil 22 which may be wound around a conical hollow member 23. The coil 22 is formed preferably from hollow copper tubing so that cooling water may be passed through it. The opposite ends of the coil 22 are extended, as at 24, and pass through the base 17 so that a high frequency alternating current may be imposed upon the coil 22 and so that cooling water or other liquid may be passed through the hollow interior of the tubing.

Disposed above the coil 22 is an annular bucking plate 25 having a central opening 26. When a high frequency electric alternating current is passed through the coil 22, a magnetic field will be set up and an opposing current flow induced in a bucking plate 25. These current flows cause a magnetic field to be generated having lines of force as indicated schematically by the lines 27 in FIG. 2 and result in a null area 28 or point where the field is at a minimum.

A mass 29 of the material to be cast is positioned within the coil 22 at the null point 28. When subjected to the magnetic field generated by the current flow through the coil 22 and the opposing action of the bucking plate 25, this mass of material will be levitated or suspended by the magnetic forces. Thus, the material 29 is suspended in the vacuum or inert atmosphere in the volume 21 without using a crucible or like container in which melting occurs.

Although the induction coil 22 could be subjected to a current flow sufficient to generate the required heat to melt the mass 29, this would require extremely high electrical power and has certain other disadvantages, as will be noted as this description proceeds. Therefore, a laser generator 31 of any known type is supported by the container 18 and is disposed to direct a laser beam 32 into the coil 22 upon the mass 29 through the aperture 26 in the bucking plate 25. This laser beam will transmit sufficient energy to the mass 29 to raise its temperature to the melting point resulting in the suspension or levitation of a molten mass of material in a null point 28.

In order to insure accurate temperature control, a mirror 33 is disposed above the bucking plate aperture 26 to receive optical reflections from the heated material 29. The mirror 33 directs these reflections to an optical pyrometer 34 or other like temperature-sensing device. The optical pyrometer is coupled in any suitable manner, as by the leads indicated schematically by the reference numeral 35, to the laser generator 31 so as to control it and maintain the desired temperature for the material 29.

When the material 29 reaches the desired temperature, the current flow through the coil 22 is decreased to decrease the magnetic field, as indicated by the decreased number of lines of flux indicated schematically by the reference numerals 39 in FIG. 3. Since the induction coil is not used primarily as a source of heat energy, the reduced current does not reduce the temperature of the material 29. The heating of the object 29 is maintained by the laser when the magnetic field is decreased. As the magnetic field is gradually decreased, the gravity acting on the molten material 29 will overcome the force of the magnetic field and the object 29 will move into registry with the sprue 13 of the mold 12. The laser generator 31 may be appropriately controlled to maintain the material 29 in a molten state at a high temperature as it is delivered to the sprue 13.

When the molten material 29 flows into the mold cavity 15, it will form an intimate bond with the interior surface of the mold 12, if the method disclosed in the aforenoted Pat. application Ser. No. 520,461 now U.S. Pat. No. 3,402,754 is employed. This intimate bond is assured due to the high degree of purity of the material 29 resulting from its lack of contact with contaminating articles, due to the presence of the high vacuum within the area 21 and because the mold 12 is formed from the same material as that being cast. With the method disclosed in said Pat. application Ser. No. 520,461, now U.S. Pat. No. 3,402,754 the sprue 13 is subsequently removed leaving a finished article having a high degree of surface finish.

If the method disclosed herein is used in conjunction with the method disclosed in aforenoted Pat. application Ser. No. 520,462, now U.S. Pat. No. 3,402,755 the mold 12 is removed, for example by any suitable destructive technique as disclosed in that application after the poured material 29 cools and solidifies. The levitation melting technique disclosed herein may also be employed in connection with the formation of the mold 12, particularly if the method disclosed in Pat. application Ser. No. 520,462 now U.S. Pat. No. 3,402,755 is used. In this latter connection, the mold 12 may be quartz or some like material that has been deposited upon a metal having a low melting point. This metal can then be subsequently removed from the mold 12 by inserting the mold 12 into an induction coil of the type shown in FIGS. 2 and 3. The mold and contained metal are then levitated by passing the high frequency current through the coil 22. Due to the low point melting point of the metal contained within the mold, the use of a laser generator for raising the temperature of the metal is unnecessary. The heat generated by the induction current is sufficient to melt the metal and permit its removal from the mold.

In the method described in this application, it has been assumed that the molten material is removed from the induction coil 22 by decreasing the current flow through it while heating from the energy source, the laser generator 31, is continued. The mold 12 may be positioned above the coil 22 rather than below it in another embodiment of the invention. The molten material 29 is transferred upwardly to the mold 12 in this embodiment by increasing the current flow through the coil 22. In this embodiment of the invention, the bucking plate or coil 25 may be eliminated. Under some circumstances the bucking plate or coil 25 may be eliminated in connection with the embodiment of the invention illustrated.

Although the disclosed method of heating an object to its melting point without the use of crucible has been described in particular reference to a casting method, other uses for this apparatus will be suggested to those skilled in the art. For example, this apparatus has use in other fields of metallurgy as well as for metallurgical research. Various changes and modifications, such as the use of different sources for generating heat energy independent of the induction coil 22 may also be employed. It has been noted that the use of an energy source independent of the coil 22 to accomplish the temperature elevation permits the temperature to be maintained when the material is transferred from the coil in its molten state. Another advantage also results form the use of this separate source of energy. If the induction coil itself were used as a source of heat energy, the extremely high energy exerted upon the material in its molten state makes it extremely difficult to control since it will flow and shift within the coil 22. Various other changes and modifications may be made without departing from the spirit and scope of the invention as defined by the appended claims.

We claim:

1. The method of melting an electrically conductive material without entraining impurities therein comprising the steps of levitating a mass of the material by subjecting the mass to a magnetic field generated by an alternating electric current passing through an induction coil, the strength of such levitating current being insufficient to raise the temperature of the mass to is its melting point, and applying a laser derived energy upon the mass of levitated material in sufficient magnitude to raise the temperature of the mass to is its melting point.